Sept. 5, 1967  W. C. RAINER  3,339,774
PLASTIC SEALING LINER HAVING A TRANSPARENT CENTRAL PORTION
Original Filed July 31, 1964

INVENTOR.
WILLIAM C. RAINER
BY Kenway, Jenney + Hildreth

ATTORNEYS

United States Patent Office 3,339,774
Patented Sept. 5, 1967

3,339,774
PLASTIC SEALING LINER HAVING A
TRANSPARENT CENTRAL PORTION
William C. Rainer, Barrington, R.I., assignor to Chemical Products Corporation, Providence, R.I., a corporation of Rhode Island
Original application July 31, 1964, Ser. No. 386,660, now Patent No. 3,265,785, dated Aug. 9, 1966. Divided and this application June 1, 1966, Ser. No. 554,594
6 Claims. (Cl. 215—40)

This is a division of my copending application Ser. No. 386,660 filed July 31, 1964, now Patent No. 3,265,785.

My invention relates to sealing closures for containers such as caps of the crown, screw lug, roll-on and snap-on types having cellular plastic liners, and to the method of preparing these closures. In particular, my invention concerns crown liners characterized by a thin, transparent web area and a peripheral shaped sealing area of cellular vinyl resin, the transparent area making it possible to provide a printed design to show clearly through the web.

My inveniton has for a principal object the provision of a closure with a liner characterized by a thin transparent or translucent portion of protective plastic film whereby advertising or decorative designs or other matter may be observed through or on the thin plastic film.

A second object is to cause such a closure to contain a shaped peripheral sealing portion of resilient cellular plastic material, whereby only a small amount of linear material is needed to achieve good sealing and impact-resistance characteristics.

Another object is to utilize means for preparing blown-in-place cellular shaped plastic crown liners in sealing closures of the foregoing type.

With the foregoing and other objects in view, the features of this invention include a method of forming blown-in-place closure liners of plastic under controlled conditions as to the thickness of the central web, and the conditions of heating to decompose the blowing agent and to fuse the plastic composition, so that the central web is inhibited from forming a cellular structure.

These and other features relate to details of the mechanism of forming cellular plastic structures, especially structures of the type and form used in closure liners. These will be more readily understood from the following description, having reference to the appended drawings in which.

Figure 1:
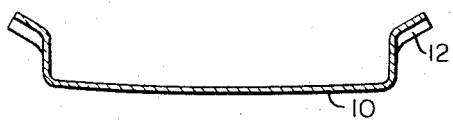
FIGS. 1 to 5 are sectional and partly schematic elevations of closures illustrating the steps of one method of preparing the same according to my invention.

I have found that a cellular plastic liner characterized by a thin transparent or translucent film or web portion and an opaque cellular peripheral portion may be prepared by depositing a measured quantity of a blowable vinyl resin plastisol in the inverted closure and forming the plastisol in place to the desired shape. A contoured punch or die or other forming means is used to depress, shape and form the plastisol in the closure into a relatively thin circular web portion and a relatively thick outer ring portion. I have found that it is possible to provide a plastisol formulation with a suitable blowing agent under conditions of temperature and time of exposure thereto, such that the blowing agent within a sufficiently thin web portion appears to be substantially inhibited from decomposition. At the same time, the ring portion fully develops to a resilient, uniformly cellular structure.

The thin, continuous fused web protects the metal of the closure from contact or reaction with the contents of the container in the event that the lacquer film with which the metal is coated has discontinuities, pin holes or scratches in it. Secondly, the web portion inhibits the contents of the container from working under the cellular sealing portion and weakening the sealing action of the liner material. Thirdly, the thin web according to this invention permits the viewing of printed matter such as trademarks, trade names, designs, advertising matter and the like, such matter being protected by the thin web portion as hereinafter described or actually formed in relief thereon. For example, my invention permits the desired visual matter to be printed on separate discs of sheet material such as paper to be inserted in the closure with the liner material being formed on the disks. The visual matter may also be printed directly on the inner surface of the closure prior to forming the liner therein. In another embodiment opaque, integral cellular relief designs may be directly formed in the thin web portion of the liner material. In this case, the thin web may be transparent, so that the design is observed against the background of the closure enamel.

The forming or molding means, on contacting the plastisol and forming the central thin web, pushes the plastisol to a peripheral ring-shaped or annular formation of relatively greater thickness of from 10 to 80 mils, preferably between 20 to 40 mils. This relatively thick portion should be of sufficient thickness so that upon decomposition of the chemical blowing agent, this section forms a resilient cellular vinyl foam generally of the preformed shape. The vinyl resin plastisol may be heated either before, during or after the forming step to a non-fluid gel state by heating at a temperature insufficient to decompose substantially the chemical blowing agent in the plastisol, a suitable temperature being from 275° F. to 340° F. In one embodiment, the closure is preheated while containing the measured amount of plastisol, and a heated punch or other forming means is used to form and gel the plastisol into the desired shape within the closure. The non-fluid, gelled, shaped plastisol may then be heated to an elevated temperature sufficient to decompose the chemical blowing agent and to fuse the plastisol into a resilient plasticized vinyl resin.

Temperatures of about 300° to 425° F. at exposure times of from 10 to 25 seconds are often employed to decompose the blowing agent and to fuse the plastisol. In the fusing step, the chemical blowing agent decomposes and forms a substantially closed cellular vinyl resin in the outer ring or peripheral portion of the gelled and shaped plastisol within the closure. The thin web portion of the plastisol remains substantially transparent. The thicker outer ring section becomes white and opaque as it expands into a shaped cellular vinyl resin of the desired density and resiliency. The thickened cellular area is covered by a tough, thin, impervious film or skin of fused vinyl resin.

The shaped cellular portion of the linear material in the closure is adapted to contact and engage the rim, locking ring or lip of the container to form a resilient, tight seal. The use of resilient cellular material at this junction has several advantages. It inhibits the squeezing out of excess plasticizer or other elements of the plastisol formulation. These elements may, in conventional non-cellular liner materials, act on or attack the enamel or lacquer coating of the closure. The use of cellular materials only at the sealing junction where required also minimizes the quantity of liner material required. Additionally, the cellular outer material gives improved sealing if there is an unevenly-shaped or chipped locking ring on the bottle, and it promotes the impact-resistance of the seal. The tough, outer fused skin and the formation of small, closed cells having relatively thick cell walls help to prevent the container rim from cutting into the thickened cellular section of the liner, particularly when the filled bottles are placed on pallets, causing an increase in the pressure on the closures. Also, the use of shaped cellular resin with added lubricants aids in reducing the removal torque requirement of the closure. The use of appropriate peripheral shapes and designs as required, such as the O-ring and saddle types described herein, substantially increases the impact resistance of the container and closure because of the relatively thick protective layers of cellular material provided at the sealing junction where contact between the container and closure takes place. While incorporating all of these advantages, my invention permits advertising and other matter to occupy the central portion of the sealing closure.

Figure 2:
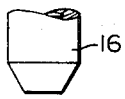
Figure 3:
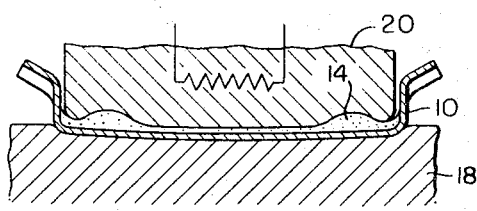

The preferred method of preparing the closures of my invention is illustrated in FIGS. 1 to 5. FIG. 1 shows an inverted metal crown closure 10 having fluted outwardly-disposed, flaring, circumferential sidewalls 12, and an enamel or lacquer finish with a design ABC printed on the inner surface thereof. FIG. 2 shows a measured amount, for example 200 to 400 milligrams (preferably about 350 milligrams), of a vinyl resin plastisol 14 deposited within the closure 10 from a dispensing nozzle 16. A typical plastisol formulation which may be employed in my invention comprises:

| | Parts by Wt. |
|---|---|
| A vinyl halide resin like polyvinyl chloride paste resin | 100 |
| A vinyl halide copolymer resin like vinyl chloride-vinylidene chloride copolymer | 72 |
| A plasticizer like dioctylphthalate | 96 |
| A chemical blowing agent like azodicarbonamide | 3 |
| A stabilizer like calcium stearate | 4 |

Figure 4:
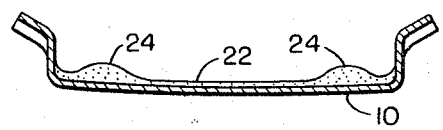

The closure 10 with the semi-fluid quantity of plastisol 14 is then placed on a platen 18 and heated to about 300 to 325° F, and an electrically heated, contoured punch 20 is then inserted into the interior of the closure 10 in close-fitting relationship for about one to three seconds or for a sufficient time to form and gel the plastisol 14 into the desired non-fluid shape. The contoured punch 20 is then retracted, leaving a shaped gelled or non-fluid plastisol liner material in the closure 10 as shown in FIG. 4. In this embodiment, the crown 10 with the plastisol 14 serves as the female member of a die and the punch 20 as the male member. The punch is formed at one end with a peripheral O-ring depression or groove of predetermined dimensions. It is controlled in its downward movement to permit a thin central web or film of the plastisol to be formed, this web being of less than the critical web thickness as further described below.

The closure 10 upon removal of the punch is characterized by a gelled, shaped vinyl plastisol having a thick outer O-ring 24 and a thin web 22 in the central area. The plastisol formulation, when gelled, is a substantially transparent resin, both in the O-ring 24 and in the central area 22. The central area is a thin web of about 2 to 5 mils thickness, and in the gelled condition it is essentially clear or transparent with the thicker O-ring shoulder portion 24 being somewhat less transparent due to the relative differences in thickness.

Figure 5:
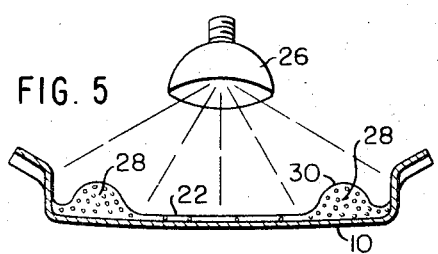

FIG. 5 shows the closure 10 being then heated by an infra-red lamp 26 to a temperature above the decomposition temperature of the blowing agent in the plastisol, and sufficient to fuse the vinyl resin. The fusion and blowing step is controlled so that the web portion 22 will show no appreciable amount of blowing, but the substantially thicker O-ring portion 24 is substantially blown to a whitish cellular expanded material 28. The ultimate result is that the central area 22 becomes a substantially transparent, thin, fused vinyl resin film while the blown cellular portion 28 appears pigmented and opaque. In the fusion step as described, employing an infra-red lamp, after 10 seconds at about 350° F. only a trace of foam was developed in the outer O-ring portion 24, while after between about 11 and 16 seconds the degree of expansion was substantial. After 16 seconds or more some degradation of the expanded cellular ring portion 28 developed.

If desired, a conventional hot air oven or other heating means may be used in place of or in conjunction with the lamp 26.

The fused, shaped linear material blown in place in the closure is cooled after the fusing step, following which it is ready for employment as a sealing closure.

A web thickness of 5 mils or less is within a range where a thin web portion of substantial transparency is produced with the web having a considerably reduced degree of expansion. This result is obtained by taking into account the decomposition temperature of the chemical blowing agent, the thickness of the film and the heat transfer characteristics. The outer ring area 24 is of sufficient thickness so that as decomposition of the chemical blowing agent takes place at atmospheric pressures, an expanded cellular vinyl resin foam 28 is formed of the desired shape. The chemical blowing agents selected should have a decomposition temperature above the gelling temperature and below the fusion temperature of the vinyl resin. A thin, tough outer skin 30 of fused vinyl resin is formed over the expanded outer ring area while the central web portion 22 is a continuation of that thin, tough protective vinyl resin film. As shown, the central circular thin web portion 22 contains only a few cells which are of insufficient number and thickness to detract appreciably from the transparency of this portion of the liner.

Figure 6:
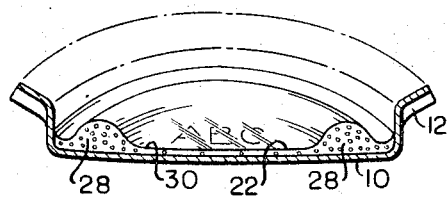
FIG. 6 is a perspective cross-sectional view of a sealing closure prepared by the method shown in FIGS. 1 to 5.

FIG. 6 is a perspective and cross-sectional view of the finished closure 10. The closure has outwardly flaring sides 12 and contains therein a blown-in-place, bonded fused vinyl resin liner material having a thin, substantially non-cellular transparent central web portion 22 through which a design, represented by the letters ABC in the drawing, may be easily seen. The outer edge of the transparent portion slopes upwardly into the thicker outer O-ring section 28, and covering the entire surface is a tough fused outer skin 30 of vinyl resin. The outer ring portion 28 may be prepared of any desired density to incorporate the desired resilient and sealing properties. The outer periphery of the ring 28 tapers toward the closure wall and the ring is bonded to the inside of the closure skirt 12.

Figure 7:
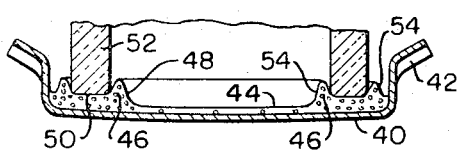
FIG. 7 is an elevation in section of a second form of shaped impact-resistant sealing closure.

FIG. 7 is a cross-sectional illustration of another embodiment of my invention in which the cellular outer ring is shaped to provide a different type of sealing action. The closure is shown in contact with the rim of a container prior to the closure being crimped in sealing engagement on to the container.

FIG. 7 shows a closure 40 having side walls 42 and a sealing liner with a thin, transparent circular web portion 44 and a peripheral, shaped cellular vinyl resin ring portion 46 the entire liner being covered with a fused vinyl skin 48 much as in the preceding form. The ring area of this embodiment, however, is of a saddle shape in cross section, formed by a punch having the appropriate contours at the forming end thereof. The saddle shape comprises a generally flat central portion 50 substantially the width of the contacting container rim 52 so that the container rim will snugly contact and engage this flat central area. From each side of the flat central area rises a cellular side skirt 54 protruding above the flat portion 50 and designed to engage the inner and outer surfaces of the container near the edges, and to encompass the container rim 52 within a cellular saddle. This particular shape of the cellular ring portion 46 permits the container rim 52 to fit snugly into the seal and protects the rim 52 from shocks.

Figure 8:
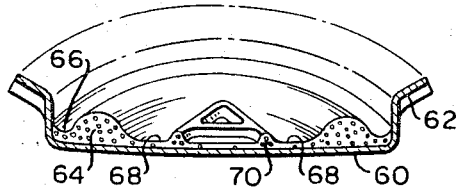
FIG. 8 is a perspective cross-sectional view of a third form of sealing closure with an opaque relief design on the thin web portion.

FIG. 8 is a cross-sectional perspective view of a further embodiment of my invention wherein the central portion of the liner material includes a color differentiated relief design raised from the thin web portion. In this embodiment, a closure 60 with side walls 62 has a blown-in-place liner very similar to that in FIG. 6, with an outer cellular ring portion 64, an outer skin 66, and a thin transparent web portion 68. The latter portion has a slightly raised, relatively opaque printed cellular design 70, illustrated in the form of an A. The relatively opaque design area 70 is observed against the transparent web 68, which permits the lacquer coating of the metal of the closure to serve as the background. The design 70 is of slightly greater thickness than the non-cellular web portion 68. The design has a sufficiently cellular structure to impart the desired degree of opaqueness to the symbol, a thickness of from 5 to 30 mils or even more being acceptable. This embodiment permits the printed designs to be imparted directly on to the central web portion 68 of the liner material, and also permits attractive design features to be obtained by varying the background observed in the transparent web area 68. As shown, the design 70 is ordinarily of substantially less thickness and of less cellular density than that of the outer cellular ring portion 64, which requires a degree of resiliency to perform its primary sealing function. The inner design 68 is merely of sufficient cellular density to impart a degree of opaqueness compared to the thin, transparent web background 68, so that the design may be observed.

The embodiment described in FIG. 8 may be prepared by employing a punch or forming means contoured to provide the desired design or lettering in the end of the molding punch. For example, the punch may form in the central area a gelled film of varying and distinct thicknesses corresponding to the desired design. The design is formed by employing a punch that will give a film of 5 mils thickness or less in the web area 68, but with a gelled outline or body of the design of a film thickness of 10 to 15 mils, with the outer thickened ring 64 being formed as previously described. The gelled liner material containing the design A in the center is blown and fused in the manner previously described. Because of the greater thickness of the design film sufficient gas is entrapped in the design to promote expansion and thereby to increase substantially the opaqueness of the blown design.

The vinyl resin plastisols employed in my process comprise those compositions wherein discrete particles of a vinyl halide polymer are dispersed in a solvating amount of a plasticizer or a plasticizer-solvent combination to form a paste or semi-fluid mixture generally identified as a plastisol or an organosol. Plastisols of this nature form a non-fluid gel-like state upon being heated to about 275° F. to 350° F. As the temperature increases, the solvation of the resin in the non-volatile plasticizers increases so that at temperatures of from about 300° F. to about 425° F. the gel becomes more viscous and of greater strength and forms a unitary fused plasticized vinyl resin. The thermoplastic resins employed in preparing plastisols may comprise a wide variety of polymeric materials including polyvinyl chloride, copolymers of vinyl chloride with short-chain esters of fatty acids such as vinyl acetate or vinyl propionate, copolymers of vinyl chloride with vinylidene chloride, and the like.

Typical plasticizers which may be employed include non-volatile plasticizers for vinyl resins, such as phthalates, adipates, sebacates and alkyl phosphates. Typical plasticizers include di-2-ethyl hexyl phthalate, diethyl octyl phthalate, acetyl tributyl citrate, dioctyl sebacate, dihexyl adipate, dibutyl phthalate, epoxidized soybean oil, and the like. These plasticizers should be used in amounts sufficient to solvate the vinyl resin particles, e.g., 40 to 120 parts of plasticizer per 100 parts of vinyl resin. I have found in particular that in some embodiments it is desirable to use from about 45% to 55% plasticizer. These low amounts of plasticizer reduce the tendency of the plasticizer to soften or to attack the enamel or lacquer finish of the closure. Additionally, since moisture absorption generally increases with plasticizer content, a reduced amount of plasticizer reduced absorption of water and alcohol-extractables by the liner material. Amounts of from 60 to 100 parts of plasticizer per 100 parts of vinyl resin may be employed in some embodiments.

The chemical blowing agents to be employed in my formulations should have decomposition temperatures between the gel and the fusion temperatures of the vinyl resin in the platisol. A decomposition temperature of about 10° to 20° above the gel temperature of the plastisol permits good results to be obtained. Typical blowing agents which may be employed include both inorganic and organic agents such as carbonate and bicarbonate salts, like sodium bicarbonate, potassium bicarbonate, ammonium carbonate, ammonium bicarbonate, and the like. Nitrogen evolving agents include azodicarbonamide, dinitrosopentamethylene tetramine and the like. The blowing agents are incorporated in the plastisol in amounts of from 0.5 to 15 parts of the blowing agent per 100 parts of the vinyl resin. Amounts of from 0.5 to 3 parts per hundred parts of resin have been found to be particularly useful.

Other additives may be incorporated in the plastisol compositions, like lubricants such as paraffin wax, lecithin, silicone fluids, glycols and polyglycols, fillers such as talc and wood flour, pigments such as titanium dioxide, and metallic powders where desired, although large amounts of these latter materials may render the thin web areas opaque. Other additives include stabilizers such as calcium stearate, zinc stearate, organotin complexes, barium and cadmium metal soaps and epoxy resins, oils, solvents and dyes.

Although my invention has been described in particular with reference to vinyl resins and vinyl halide plastisol compositions, other thermoplastic and thermosetting compositions comprising natural and synthetic elastomers may be employed. Any liner material may be used which is capable of being formed into the desired shape and subsequently blown in place. Furthermore, where desired, the plastisol may be applied to a number of metal crowns on a known type of high-speed automatic machine where the closures are each spun on a revolving chuck so that the semi-fluid plastisol will be spread across the entire face of the closure prior to inserting the molding punch. In certain operations this might be desirable since the rotation will cause a substantial portion of the plastisol to accumulate at the periphery of the closure, thereby permitting the heated molding punch to quickly shape and gel the material. This action assists the molding punch in squeezing the excess material toward the edges of the closure.

As thus described, my process and the cellular lined closures produced thereby permit designs to be displayed on the inner and central portions of the closure, while forming peripheral rings of cellular material. My closures permit good sealing contact between the rim of the container and the resilient cellular material, affording good sealing and shock resistance to containers provided with my closures.

It will be recognized by those skilled in this art that while the invention has been described with particular reference to certain preferred methods and forms with certain specified modifications or adaptations thereof, other variations of an obvious nature may also be employed without departing from the spirit or scope thereof.

What I claim is:

1. A sealing closure for a container comprising a closure member containing therein a plasticized, fused vinyl plastisol liner bonded to the interior of the closure member, said liner having a central web portion and an outer ring portion, the central web portion containing a relatively thin transparent area and a predetermined relatively thick, expanded, cellular, opaque design, and the outer ring portion being relatively thick, expanded, cellular, opaque, resilient, and capable of being placed in sealing contact with the container.

2. The closure of claim 1, in which the outer ring portion has an impervious outer skin of fused vinyl resin.

3. A sealing closure for a container comprising a closure member containing therein a plasticized, fused vinyl plastisol liner formed from a single homogeneous mass of material, said liner being bonded to the interior of the closure member, said liner having a central web portion and an outer ring portion, the central web portion containing a relatively thin transparent area, and the outer ring portion being relatively thick, expanded, cellular, opaque, resilient and capable of being placed in sealing contact with the container.

4. The closure of claim 3, in which the outer ring portion has an impervious outer skin of fused vinyl resin.

5. The closure of claim 3 wherein the closure member has a lacquered finish containing printed matter in the central portion thereof which is visible through the central web portion of the liner.

6. The closure of claim 3 wherein the ring portion is characterized by a saddle design having a central portion of sufficient width to place the rim of the container in sealing engagement therewith and upwardly protruding skirt elements of cellular vinyl resin on each side of the central portion to encompass the inner and outer rim surfaces of the container.

References Cited

UNITED STATES PATENTS

| 2,543,775 | 3/1951 | Gora | 215—40 |
| 3,169,656 | 2/1965 | Wieckmann | 215—40 |
| 3,261,895 | 7/1966 | Strickman | 215—40 X |
| 3,233,770 | 2/1966 | Waters | 215—40 |

JOSEPH R. LECLAIR, *Primary Examiner.*

D. F. NORTON, *Assistant Examiner.*

Disclaimer 3,339,774.—*William C. Rainer*, Barrington, R.I. PLASTIC SEALING LINER HAVING A TRANSPARENT CENTRAL PORTION. Patent dated Sept. 5, 1967. Disclaimer filed Apr. 16, 1970, by the assignee, *W. H. Hutchinson & Son, Inc.*

Hereby enters this disclaimer to claims 3, 4 and 5 of said patent.
[*Official Gazette June 16, 1970.*]